(12) United States Patent
Ridgill, II et al.

(10) Patent No.: US 11,445,057 B2
(45) Date of Patent: Sep. 13, 2022

(54) PRIVATE CONTACT SHARING

(71) Applicant: International Business Machines Corporation, Armonk, NY (US)

(72) Inventors: Stephen Paul Ridgill, II, Raleigh, NC (US); Ashley Kristin Silva, Durham, NC (US); Aditya Mandhare, Navi Mumbai (IN); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 16/903,912

(22) Filed: Jun. 17, 2020

(65) Prior Publication Data

US 2021/0400130 A1 Dec. 23, 2021

(51) Int. Cl.
*H04M 1/2757* (2020.01)
*H04M 1/275* (2006.01)
*H04W 4/80* (2018.01)
*H04L 9/32* (2006.01)

(52) U.S. Cl.
CPC ........ *H04M 1/2757* (2020.01); *H04L 9/3273* (2013.01); *H04L 9/3297* (2013.01); *H04M 1/275* (2013.01); *H04W 4/80* (2018.02)

(58) Field of Classification Search
None
See application file for complete search history.

(56) References Cited

U.S. PATENT DOCUMENTS

| | | |
|---|---|---|
| 9,106,477 B1 | 8/2015 | Youngs et al. |
| 2008/0279356 A1 | 11/2008 | Zazza |
| 2012/0289205 A1 | 11/2012 | Burgess |
| 2015/0081904 A1* | 3/2015 | Guedalia ................ H04L 67/12 |
| | | 709/225 |

(Continued)

OTHER PUBLICATIONS

George Perry, "Masked Numbers: It's not as insidious as it sounds", Blog, Aug. 16, 2018, https://www.bandwidth.com/blog/masked-numbers-its-not-as-insidious-as-it-sounds/, 8 pages.

(Continued)

*Primary Examiner* — Frantz Bataille
(74) *Attorney, Agent, or Firm* — Edell, Shapiro & Finnan, LLC

(57) ABSTRACT

A method and system for obscured contact sharing is provided. In an embodiment, the method includes receiving at a first user device a request from a second user device to provide an obscured contact, wherein the obscured contact includes a plurality of information elements. The first user device receives from the second user device the obscured contact and data about obscuring at least one of the information elements of the obscured contact. Based on the data, an operating system of the first user device obscures the at least one information element from presentation by the first user device to a user while at the same time being able to use the obscured information element for a predetermined time. The operating system of the first user device removes the at least one information element from contact information storage of the first user device in response to detection of a predetermined time indicated by the second user device or a delete command from the second user device.

16 Claims, 8 Drawing Sheets

(56) References Cited

U.S. PATENT DOCUMENTS

2016/0148014 A1* 5/2016 Peterson ............ G06F 21/6245
726/28
2017/0243162 A1 8/2017 Gavrielides et al.
2020/0403956 A1* 12/2020 Adamski ................... G06F 3/14

OTHER PUBLICATIONS

Iplum.com, "How a Physician Keeps his Cell Phone Number Private using HIPPA Complaint iPlum?", downloaded from the internet on Jun. 2, 2020, https://iplum.com/blog/how-a-physician-calls-patients-while-keeping-his-cell-phone-number-private/, 3 pages.
Samsung.com, "Change Samsung phone number to private", Apr. 1, 2020, https://www.samsung.com/au/support/mobile-devices/how-do-i-change-my-number-to-private/, 3 pages.
Website, "Google Voice", https://voice.google.com/about, downloaded from the internet on Jun. 17, 2020, 4 pages.
Disclosed Anonymously, "A Method and apparatus to hide and auto-sync shared contact information", IPCOM000227641D, May 10, 2013, https://ip.com/IPCOM/000227641, 9 pages.

* cited by examiner

PRIVATE CONTACT SHARING

BACKGROUND

1. Technical Field

Present invention embodiments relate to computer systems and methods for contact information sharing, and more specifically, to computer systems and methods for obscured contact information sharing.

2. Discussion of the Related Art

Mobile devices may be used by users to communicate with each other. A user may provide another user with contact information (the providing user), such as the user's phone number. The user that received the phone number (the receiving user) may use the phone number to call the user at the user's mobile device. The receiving user may use the contact information beyond the desires of the user providing user. The receiving user may abuse use of the contact information or may share the information with others without the providing user's permission. Users may desire to keep their contact information private and have more control over their contact information for a variety of reasons, and may find it difficult or cumbersome to have to use alternative contact information or applications in order to mask their information.

SUMMARY

According to one embodiment of the present invention, a method for obscured contact information sharing is provided. The method comprises receiving, via an electronic communications interface of a first user device, a request from a second user device to provide an obscured contact, wherein the obscured contact includes a plurality of information elements. The method also comprises receiving, via an electronic communications interface of the first user device from the second user device, the obscured contact and data about obscuring at least one of the plurality of information elements of the obscured contact. The method also comprises based on the data about obscuring the at least one of the plurality of information elements, obscuring, by an operating system of the first user device, the at least one information element of the obscured contact from presentation by the first user device to a user. The method also comprises removing, by the operating system of the first user device, the at least one information element of the obscured contact from contact information storage of the first user device in response to detection of a predetermined time indicated by the second user device or a delete command from the second user device. Embodiments of the present invention further include a computer system and program product for obscured contact sharing in substantially the same manner described above.

BRIEF DESCRIPTION OF THE DRAWINGS

Generally, like reference numerals in the various figures are utilized to designate like components.

DETAILED DESCRIPTION

Present invention embodiments allow for contacts to be shared privately by user devices for a defined and/or controllable time. The obscured contact may include a plurality of information elements, at least one of which may be obscured from presentation by the user device with which the contact was shared allowed while being allowed to be used by the user device for communicating with the contact.

Present invention embodiments may be incorporated into operating systems of user devices. Present invention embodiments may allow for the ability to share obscured contacts between user devices as a native part of mobile device operating system software, without requiring users to download a third party application and/or get a new or different information elements (e.g., a separate phone number).

Present invention embodiments may allow for temporary use of information elements of an obscured contact during which one or more of the information elements of the obscured contact are obscured from presentation by the device with which the obscured contact was shared.

Present invention embodiments may enhance operating systems of user devices to allow for local masking and mapping to obscured contacts without exposing information elements of the obscured contact.

Present invention embodiments allow for an information element (e.g., a contact name) of an obscured contact to be shared for a defined and/or controllable time to a user device of a second user during which other information elements that may be shared (e.g., phone number, email address, etc.) may be used by the user device while being obscured from the user. User can selectively obscure contact information while allowing communication, for example, by text or phone, as natively allowed by the user device without the user having to worry about the user who the obscured contact was shared with being able to contact them after a desired time frame.

Figure 1:
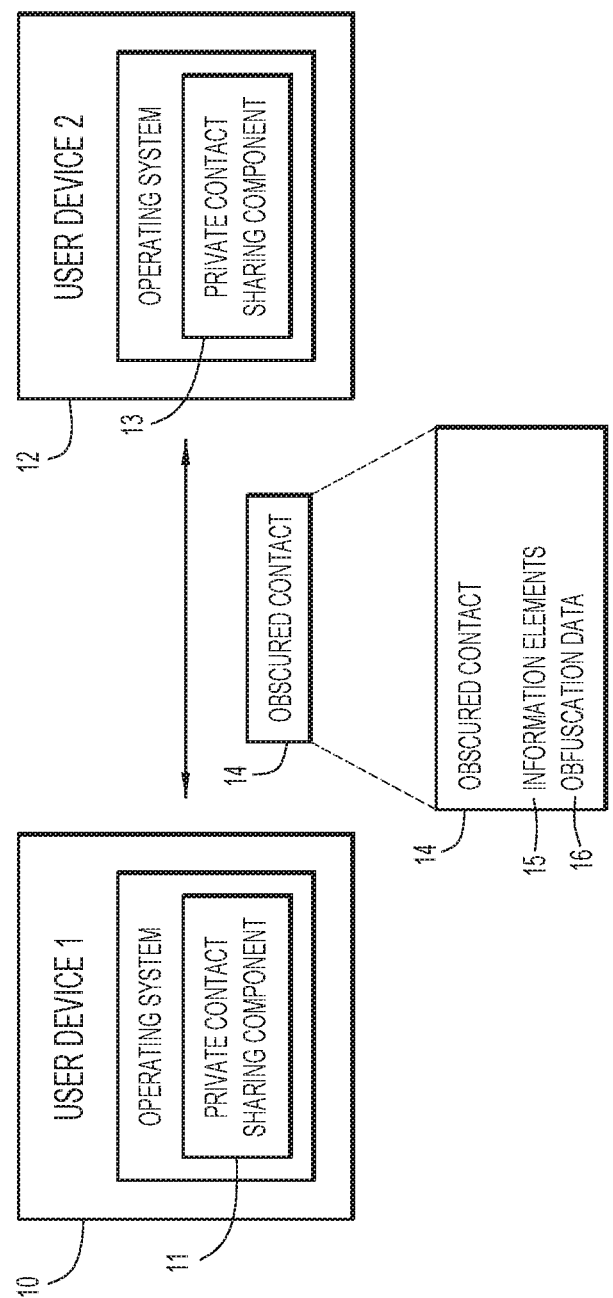
FIG. 1 is a diagrammatic illustration of an example computing environment according to an embodiment of the present invention.

An example environment for use with present invention embodiments is illustrated in FIG. 1. Specifically, the environment includes a user device 10 and a user device 12, which may be operated by respective users. User devices 10 and 12 may take on a variety of forms, including, without limitation, smartphones, tablet computers, cellular telephones, personal computers, handheld computers, laptop computers, wearable computers, integrated devices combining one or more of the preceding devices, or the like.

User devices 10 and 12 may be capable of communicating with each other to share obscured contacts. For example, user devices 10 and 12 may communicate with each other using a short-range wireless communication technology, such as near field communication (NFC), or using any other wireless or wired communication technology that allows for contact information to be exchanged between the user devices 10 and 12. Each of user devices 10 and 12 may be capable of discovering one or more user devices that are nearby or proximate with which to share a contact. For example, a user device (e.g., user device 10 or user device 12) may be capable of discovering another user device (e.g., user device 12 or user device 10) when the other user device is within range of discovery.

In an example embodiment, each of user devices 10 and 12 includes a private contact sharing component (also referred to herein as an obscured contact sharing component). For example, the user device 10 may include a private contact sharing component 11, and the user device 12 may include a private contact sharing component 13. Each of the private sharing components may be embedded with or incorporated with an operating system of the respective user devices 10 and 12. The private sharing component may be embedded with the operating system of its respective user device to modify the operating system's handling of contacts. For example, the private sharing component may modify logic of the operating system corresponding to the use and storage of contacts and information elements of the contacts. This may include the addition, removal, and/or modification of various fields and/or parameters used in carrying out calls, texts, email, and/or other manners of communication, and may include storage and use of additional data and/or metadata of the contact and information elements of the contact. The private contact sharing component may be a module that may include one or more modules or units to perform the various functions of present invention embodiments described below. The module(s) may be implemented by any combination of any quantity of software and/or hardware modules or units, and may reside within memory (e.g., memory 835 of FIG. 8) of user devices 10 and 12 for execution by a processor (e.g., processor 815 of FIG. 8).

In an example embodiment, a sending device sends an obscured contact 14 to a receiving device. For example, if user device 10 is the user device that is sending an obscured contact to user device 12, then in such a scenario, user device 10 would be a sending device and user device 12 would be a receiving device. A user device may be a sending device for a first obscured contact and a receiving device for a second obscured contact. For example, if user device 10 sends a first obscured contact to user device 12, then user device 10 would be a sending device and user device 12 would be a receiving device, whereas if user device 12 sends a second obscured contact to user device 10, then user device 12 would be a sending device and user device 10 would be a receiving device. The receiving device may be configured to use the obscured information without making it accessible to the recipient. For example, operating system (OS) hooks may limit access to the information to internal use where applicable (e.g., calling, sending a text, etc.).

As shown in FIG. 1, obscured contact 14 includes at least information elements 15 and obfuscation data 16. Information elements 15 may be any type of contact information associated with a user and/or a user device. For example, information elements 15 may include one or more of a phone number, an email address, and a contact name. Obfuscation data 16 may be or include any information about obscuring one or more of the information elements 15. For example, obfuscation data may include one or more of a time parameter, one or more information elements to be shared without being obscured, one or more information elements to be shared and obscured, and presentation parameters of obscured information element(s).

When a first user desires to share their contact information with a second user, the user may select (e.g. via a user interface of the user device) a "share contact" user interface element, which may initiate private contact sharing. For example, various options may be presented to the user to set obfuscation parameters of the contact sharing, including one or more of time parameters, one or more information elements to be shared without being obscured, one or more information elements to be shared and obscured, and presentation parameters of obscured information element(s). For example, the obfuscation data may include a time parameter that indicates the time for which the contact is validly shared for, after which the contact is deleted. For example, the obfuscation parameters may identify which information element(s) are being shared without being obscured and which are being shared and obfuscated. For example, the information elements may include a contact name, the user's phone number, and the user's email address, and the obfuscation parameters may indicate that the user's phone number and email address are to be obscured, whereas the contact name is not to be obscured.

The receiving device receives from the sending device the obscured contact and obfuscation data about obscuring at least one information element of the obscured contact. An operating system of the receiving device obscures, based on the obfuscation data, the at least one information element of the obscured contact from presentation by the receiving device to a user. As mentioned above, the obfuscation data may include time parameters corresponding to an expiration of the shared contact. In an example embodiment, the sending user device may allow for existing time parameters to be adjusted (e.g., lengthened or shortened) or removed, and/or new time parameters to be set by the sending user. For example, the sending user device may send a command to the device or system that maintains or is responsible for maintaining the time parameter(s), which in some embodiments may be the receiving user device and in some embodiments may be a central service. The receiving device may add the obscured contact to a contact list. Depending on the obfuscation data, certain information elements may be obscured from the user's view. For example, the user may be able to view the contact name (e.g., in a contact list), but the phone number may be obscured.

In an example embodiment, the contact or some or all of the information elements may be stored on the user's device (e.g., on a file system of the user's device). In such an embodiment, some or all of the information elements and/or some or all of the obfuscation data may be stored at the user device as an encrypted value(s). For example, the phone number may be encrypted and stored as an encrypted value, whereas the remaining information elements may not be encrypted prior to being stored. In another example embodiment, some or all of the information elements and/or some or all of the obfuscation data may be stored separate from any local storage of the user device. In such an embodiment, some or all of the information elements and/or some or all of the obfuscation data may be stored at a central service as a searchable values(s) (e.g., key/value pair). For example, the user device may store an indicator that may be mapped to the information element(s) and/or obfuscation data stored at the central service. In an example embodiment, a combination of local storage of the user device and separate storage may be used to store some or all of the information elements and/or some or all of the obfuscation data.

The sending device may include a contact sharing management view that allows the user to see who and/or what devices the contacts have been shared with and/or other information associated with shared contacts. For example, the contact sharing management view may allow for a user to see that the phone number of its mobile device has been shared obscurely with three other devices, Device A, Device B, and Device C, for respective times T1, T2, and T3. T1, T2, and T3 may be the same time or a different time. One or more of the times T1, T2, and T3 may be a default time (e.g., a time automatically selected by default), may be selected from a list of times, or may be any other suitable time.

In the example of FIG. 1, each of the user devices 10 includes NFC capability and an operating system. For example, the logic of the operating system associated with contacts may be modified to include a field for a contact to indicate that the contact is to be obscured. The field can be checked before display to see whether or not the contact is to be obscured. If the field indicates that the contact is to be obscured and the current time is one in which the contact is to be obscured, then the user device may obscure the contact. For example, the user device may not present the contact at all, or may present the contact in such a way that it is unrecognizable (e.g., blurred, blacked out, etc.).

User devices 10 enable users to send and/or receive obscured contacts (e.g., information elements of obscured contacts) for a defined and/or controllable time, during which some or all of the information elements of the obscured contact may be obscured from presentation by the receiving device while the receiving device is able to use the information elements to carry out communication tasks (e.g., sending or receiving texts, sending or receiving calls, sending or receiving emails, etc.). For example, the user of the user device that receives the obscured contact (also referred to herein as the "receiving device") may be able to call or text the user of the sending device at the phone number shared with the receiving device without the receiving device presenting the phone number.

User devices 10 and 12 may communicate with each other over a network. The network may be implemented by any number of any suitable communications media (e.g., wide area network (WAN), local area network (LAN), Internet, Intranet, etc.). User devices 10 and 12 may communicate with one or more server systems that may be local or remote to one or more of the user devices 10 and 12.

The user devices 10 and 12 may present a user interface (e.g., a graphical user interface (GUI)) or other interface (e.g., command line prompts, audio prompts, etc.) to solicit information from users pertaining to private contact sharing and using shared contacts for communication.

User devices 10 and 12 may be implemented by any conventional or other computer systems preferably equipped with a display or monitor, a base (e.g., including at least one hardware processor 15 (e.g., microprocessor, controller, central processing unit (CPU), etc.), one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, module, browser/interface software, etc.).

Figure 2:
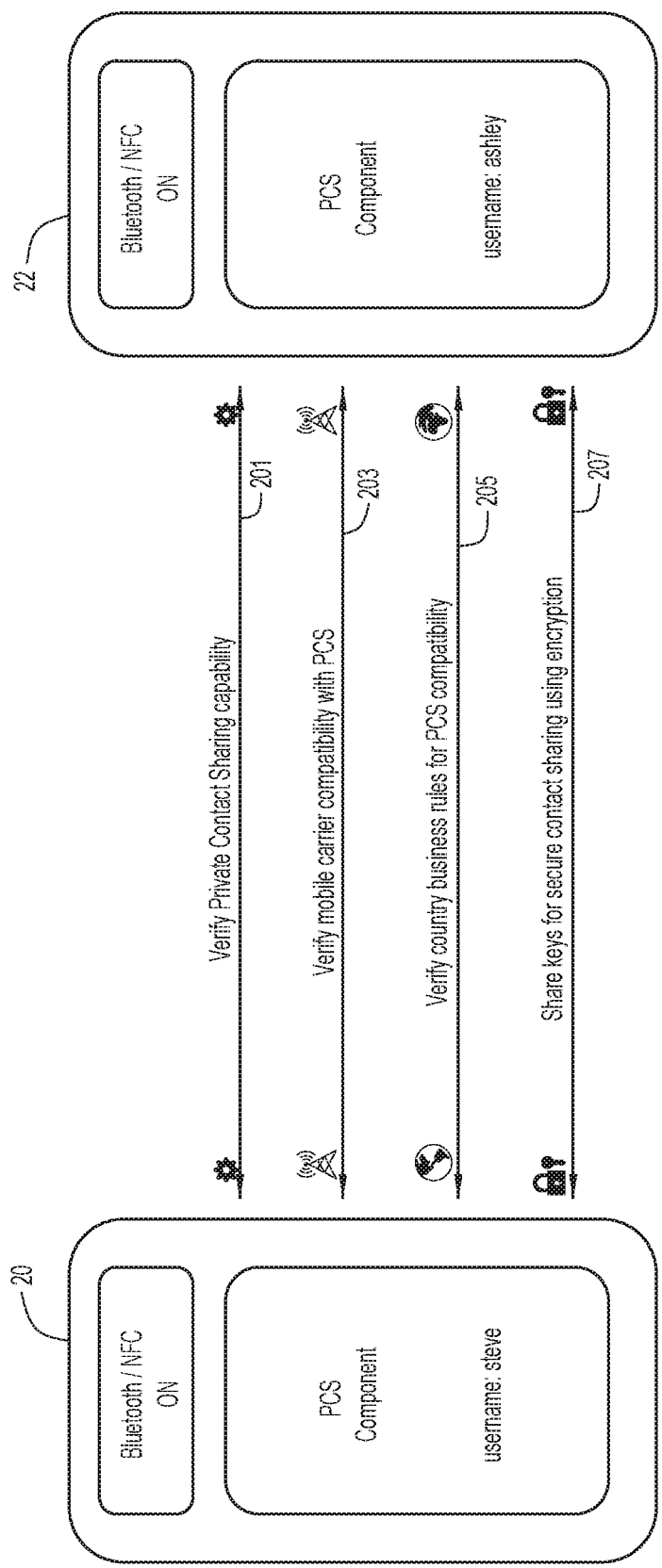
FIG. 2 is a diagram illustrating an obscured contact sharing handshake according to an embodiment of the present invention.

Referring now to FIG. 2, a diagram illustrating an obscured contact sharing handshake is shown, according to an example embodiment. In this embodiment, user devices 20 and 22 carry out the obscured contact sharing handshake.

As shown in FIG. 2, user devices 20 and 22 each include at least a private contact sharing component (shown in FIGS. 2-6 and referred to herein as PCS component) and short-range wireless communication capability to communicate with each other. At 201, obscured contact sharing capability may be verified. For example, the user devices 20 and 22 may exchange messages that indicate that the user devices 20 and 22 support obscured contact sharing. For example, the user device 20 may send a request to the user device 22 for the user device 22 to provide verification that the user device 22 has private contact sharing capability. The request may include an indication that the user device 20 has private contact sharing capability. Alternatively, or in addition to the indication being included in the request, the user device 20 may send an indication that the user device 20 has private contact sharing capability separately from the request. If the user device 22 has private contact sharing capability, the user device 22 may send a response to the user device 20 to verify that the user device 22 has private contact sharing capability. If the user device 22 does not have private contact sharing capability, the user device 22 may ignore the request or may fail to send any response to the request.

In an example embodiment, the obscured contact sharing handshake may be initiated in one or more of a variety of different ways. For example, a user of the user device 20 may make a selection via a user interface of the user device 20 to initiate the private contact sharing handshake. In response to the selection, the user device 20 may detect devices that are capable of communication with the user device 20 and within communication range. Devices that are within range may be displayed to the user of the user device 20, and the user of the user device 20 may select a device with which the user device 20 is to initiate a private contact sharing handshake.

At 203, telecommunication service provider (e.g., mobile carrier) compatibility with obscured contact sharing may be verified. For example, each of the user devices 20 and 22 may provide information indicating that its respective telecommunication service provider is compatible with obscured contact sharing. For example, the user device 20 may obtain information that indicates that its telecommunication service provider is compatible with obscured contact sharing and may send that information to the user device 22. For example, the user device 20 may store such information locally or remotely, and may obtain the information as part of the verification. Alternatively, or in addition to having the information stored, the user device 20 may send a request to its telecommunication service provider for this information, and in response the telecommunication service provider may send the information to the first user device, which sends the information to the second user device. In an example embodiment, a telecommunication service provider being compatible with obscured contact sharing may include the telecommunication service provider obscuring the sending device's phone number from the receiving device's call records or logs.

At 205, country business rules for private contact sharing compatibility may be verified. Such rules may be stored locally or remotely or requested on demand. For example, a country business rule or masking code may be verified so that it may be used, e.g., prepended, to an information element that is to be obscured when used. For example, a country business rule or masking code may be prepended to the phone number before a call is placed to the phone number so as to signify to service providers to hide the phone number from the user's account, display it as a blocked number on the user's phone records, and/or otherwise obscure the phone number from being visible to the user from service provider records.

At 207, cryptographic keys may be exchanged for use in private contact sharing. The user devices 20 and 22 may use any suitable cryptographic key exchange protocol to establish cryptographic keys (e.g., encryption and decryption keys) for use in sharing contacts.

Figure 3:
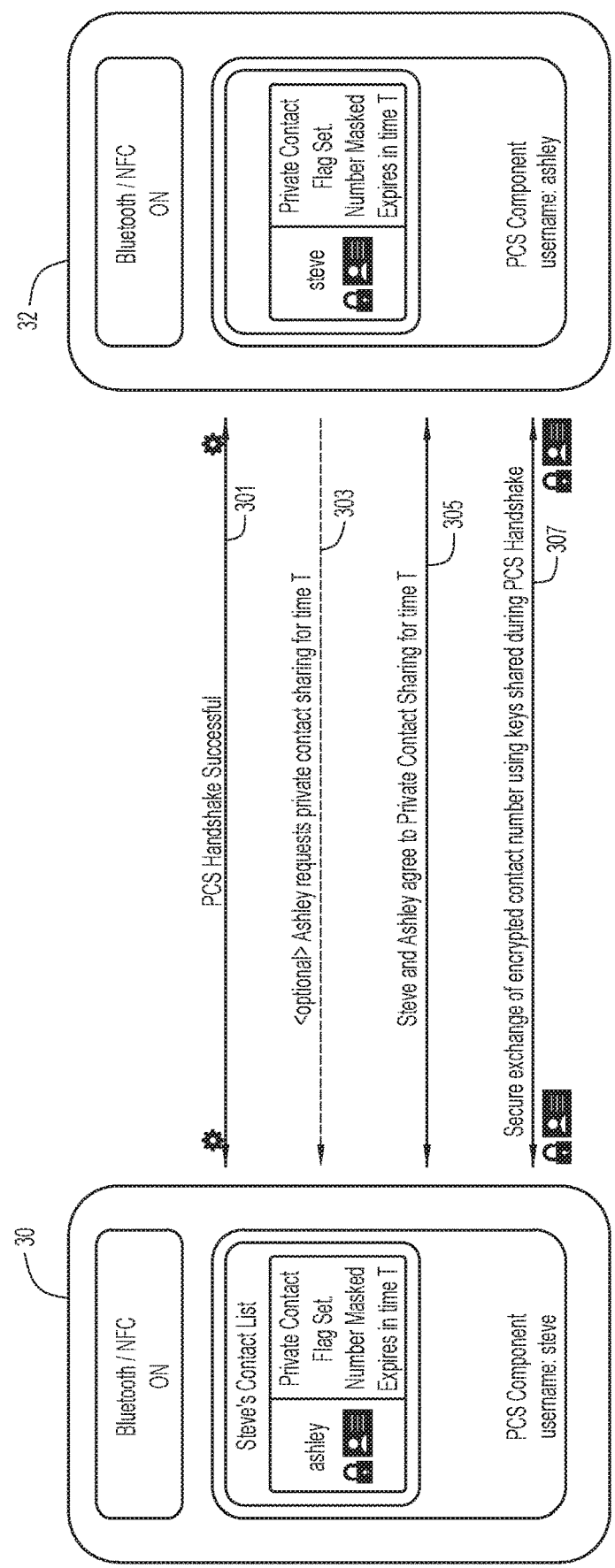
FIG. 3 is a diagram illustrating private contact sharing according to an embodiment of the present invention.

FIG. 3 is a diagram illustrating private contact sharing according to an example embodiment. In this example, both user devices support private contact sharing. At 301, a successful private contact sharing handshake is completed. For example, the user devices 30 and 32 may perform the private contact sharing handshake described with respect to FIG. 2.

At 303, user device 32 may specify one or more time parameters for the obscured contact to be shared. Similarly, user device 30 may specify one or more time parameters for the obscured contact to be shared. For example, the user device 32 may specify a time T for which the obscured contact from the sending device is able to be accessed for use by the receiving device and after which the obscured contact is to expire. The user device 30 may agree to the time parameter(s) specified by the user device 32 or may disagree with the time parameter(s). The user device 30 may specify a time T that may be the same or different than the time T specified by the user device 32 or the user device 30 may not specify any time. For example, the user device 32 may specify a time T1 for its obscured contact to be validly used by the user device 30, and the user device 30 may specify a time T2 (that may be the same or different than the time T1) for its obscured contact to be validly used by the user device 32.

At 305, private contact sharing and time parameter(s) may be agreed to by the user devices. For example, user device 30 may send a message to user device 32 indicating agreement or acceptance of the time parameter(s) requested by user device 32.

At 307, using the encryption keys shared during the handshake, the user devices 30 and 32 may carry out a secure exchange of the obscured contact(s). For example, the obscured contact may include a phone number of the user device, and the phone number may be encrypted using the encryption key.

The receiving device may be configured to receive the encrypted information elements and store the encrypted contact details in a contact list. The contact list may include a number of fields for each contact of the contact list. For example, each contact of the contact list may include a field for one or more of a name, a phone number, an email address, a private contact flag, and a time parameter. One or more of the information elements may be obscured (i.e., not displayed) to the recipient, however, the recipient's user device is configured to decrypt the obscured information element internally so that the sender may be called, emailed, or texted without revealing the obscured information to the receipt.

Figure 4:
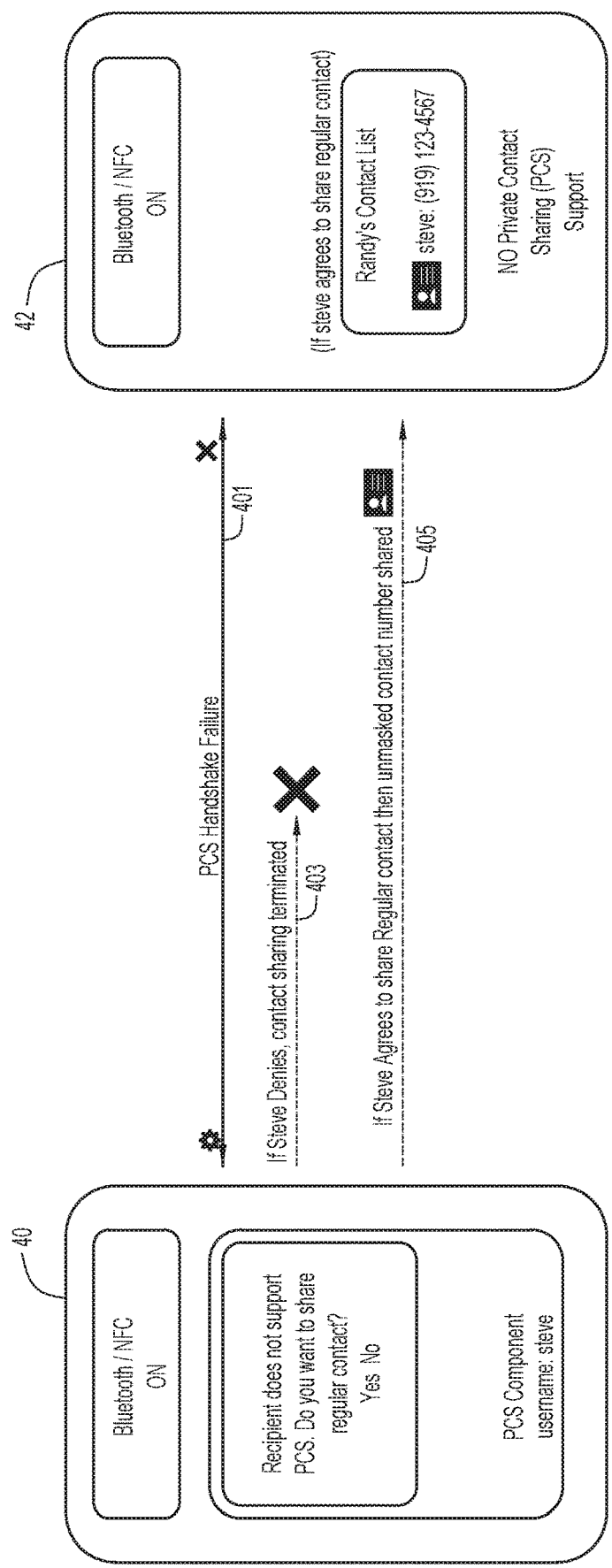
FIG. 4 is a diagram illustrating an example where a sending user device supports private contact sharing and a receiving user device does not support private contact sharing, according to an embodiment of the present invention.

FIG. 4 is a diagram illustrating an example contact sharing attempt where a sending (sender) user device supports private contact sharing and a receiving (recipient) user device does not support private contact sharing, according to an example embodiment. In this example, user device 40 supports private contact sharing and user device 42 does not support private contact sharing. At 401, a private contact sharing handshake fails between the user device 40 and the user device 42. In response to the failure of the handshake, the user device 40 may alert the user of the user device 40 that the user device 42 does not support private contact sharing and/or ask whether the user wants to share the contact details without using the private contact sharing. For example, the alert may be presented, e.g., audibly and/or visually, via a user interface of and/or communicatively coupled to the user device. Input may be provided by the user to indicate that the user desires to proceed to share the unobscured contact (i.e., to proceed without private contact sharing). If the user indicates via the input that the user does not want to share the contact without private contact sharing, then, at 403, in response to the received input the contact sharing attempt may end without sharing the contact. If the user indicates via the input that the user does want to share the contact without private contact sharing, then at 405, in response to the received input, the user device 40 can communicate the contact to the user device 42. After the contact is communicated without private contact sharing to the user device 42, the contact may be able to be presented in an unobscured manner by the user device 42.

Figure 5:
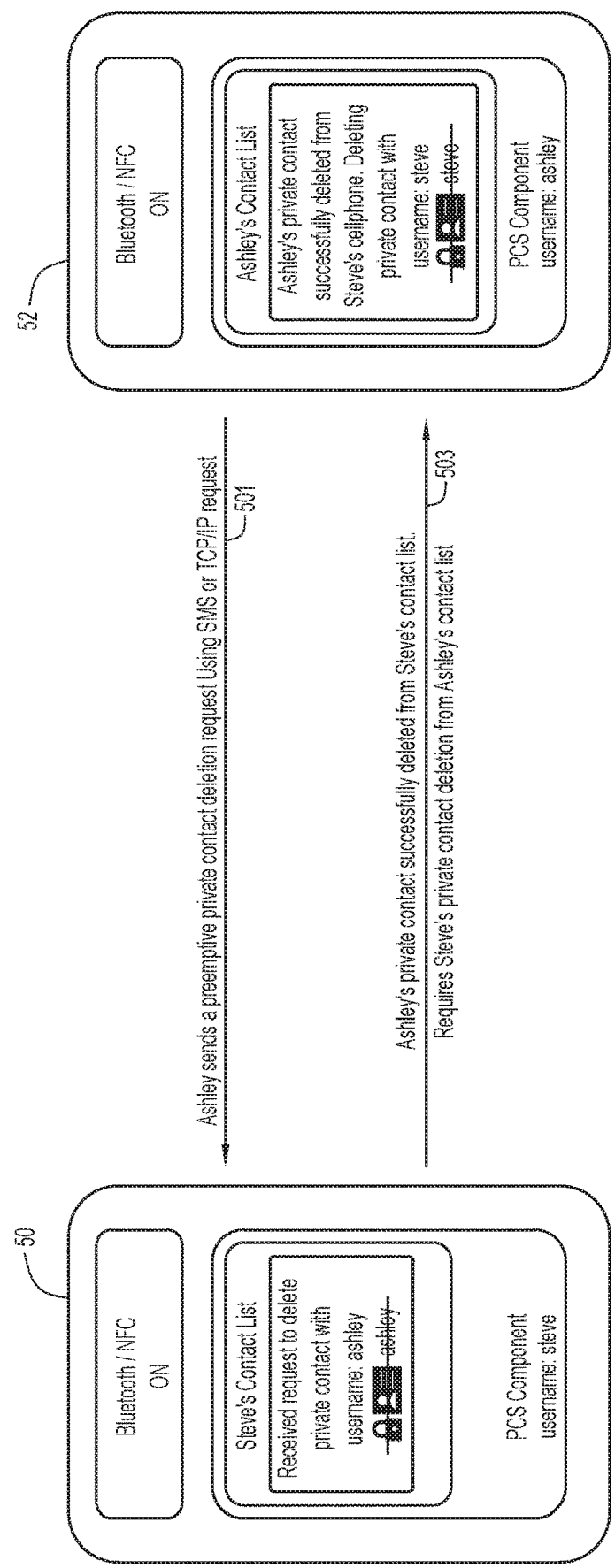
FIG. 5 is a diagram illustrating an example of a manner of obscured contact deletion according to an embodiment of the present invention.

FIG. 5 is a diagram illustrating an example of a manner of obscured contact deletion according to an example embodiment. In this example, the user device 50 and user device 52 have private contact sharing capability. Further, in this example, the user device 52 has shared an obscured contact with the user device 50 using private contact sharing, and the user device 50 stores the obscured contact or has access to the obscured contact. At 501, the user device 52 sends a preemptive private contact deletion request to the user device 50. At the time the preemptive contact deletion request is sent, the obscured contact is validly useable by the user device 50. That is to say, the obscured contact has not yet expired or otherwise been revoked. For example, the user of the device 52 may desire for the obscured contact to expire prior to a set expiration time. The preemptive private contact deletion request may be sent using any suitable communication technology. In an example embodiment, the preemptive private contact deletion request may be sent using short message service (SMS), and the user device receiving the preemptive private contact deletion request may be configured to monitor SMS messages for such a request. In an example embodiment, the preemptive private contact deletion request may be sent using a Transmission Control Protocol/Internet Protocol (TCP/IP) request and the user device receiving the preemptive private contact deletion request may be configured to monitor TCP/IP requests for such a request.

In response to receiving the preemptive contact deletion request, the user device 50 may delete the obscured contact shared by the user of user device 50. If the user device 52 has an obscured contact of the user of the user device 50, then in response to receiving the preemptive contact deletion request, the user device 50 may prompt the user of the user device 50 as to whether the user device 50 should send a preemptive contact deletion request to the user device 52. Alternatively, if the user device 52 has an obscured contact of the user of the user device 50, then in response to receiving the preemptive contact deletion request, the user device 50 the user device 50 may automatically send a preemptive contact deletion request to the user device 52.

The user who shared the contact information may go into their contact sharing management view. The user may select the contact with whom they wanted to stop sharing their information with and select an option to delete or remove the contact information from the device if it is stored there or remove permissions.

The user may also desire to modify the agreed upon time to a different time (e.g., an earlier time or a later time). If the user wants to extend the time that the information is shared for, the user who shared the contact information may go into their contact sharing management view and select the contact with whom they wanted to extend the sharing of their information with and select an option to do so (extend time, change expiration, etc.) along with the new expiration date/time. Alternatively, the expiration time may be removed and the contact may be shared indefinitely, or in other words, no particular expiration time may be set.

In response to the extend/modify option being selected, a notification may be sent by the user device to the device that the contact was shared with, and the receiving device can update the expiration date associated with the shared contact in the OS file system of the receiving device. If a central service is used to save the shared contact information, a notification may be sent to update the key/value pair to have a new expiration date.

A message may be sent to the user device that received the contact and the user device would process the message and remove the contact information from the user device (including any information saved directly to the user device). The message may be sent from the sending device to the receiving device using any suitable communication medium or media. For example, a message may be sent using SMS or a TCP/IP request may be sent. If a central service is used to save the shared contact details, the central service would be notified that the user desires to expire the other user's access to the contact information, and the key/value pair would be removed for the user with whom the contact was shared with.

Figure 6:
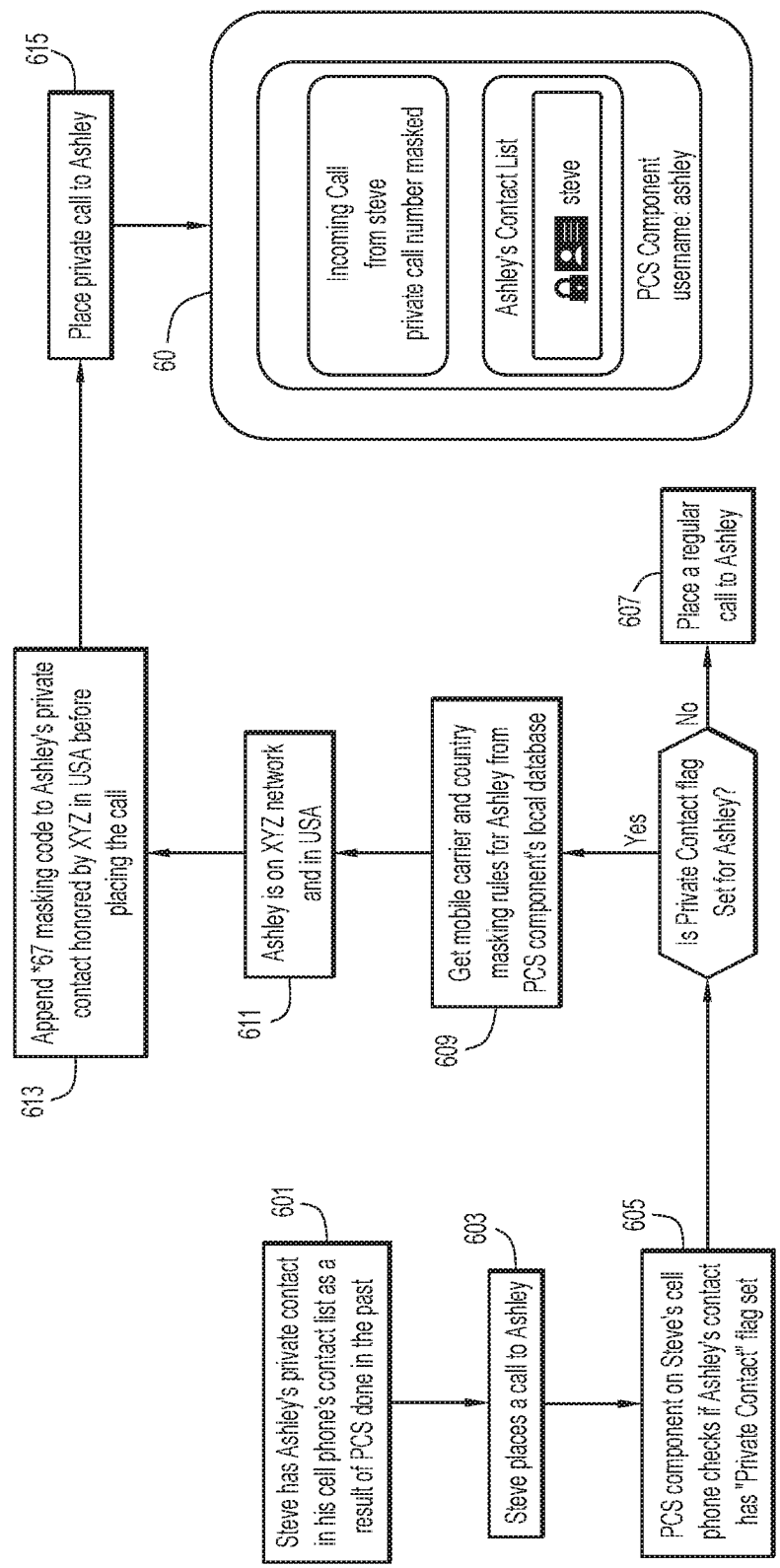
FIG. 6 is a flow chart illustrating a method of placing a private call according to an embodiment of the prevent invention.

FIG. 6 is a flow chart illustrating a method of placing a private call according to an example embodiment. At 601, the user device that is used to make the call (the "calling user device," not shown) has access to the obscured contact of another user device 60 as a result of carrying out an obscured contact sharing method. In this example, the obscured contact includes an information element that is a phone number of the user device 60. At 603, the user of the calling user device places a call to the contact. For example, the user of the calling user device may select, from a contact list, the contact the user desires to call. Alternatively, a central service may be used that allows the user to call using, for example, voice over internet protocol (VOIP). When the user selects "call" on the calling device, the central service would be contacted (e.g., the calling device would send a message to the central service that the user desires to call the contact). The central service may locate a key value pair stored for the contact (e.g., may use information in the message to identify the key value pair) and may place the call using VOIP. The central service may perform a mapping to display the contact name on the user device that is being called using VOIP, and may obscure the number of the calling device from being displayed.

At 605, the PCS component on the calling user device checks if the contact of the user device 60 is an obscured contact. For example, the PCS component checks if the calling user device has a "Private Contact" flag set for this contact. If the private contact flag is not set for this contact, then at 607, a regular call is placed by the calling user device. For example, the calling user device may obtain the phone number that is mapped to the contact name. If the private contact flag is set for this contact, then at 609 mobile carrier and country masking rules are retrieved, for example, from the PCS component's local storage. At 611, the mobile carrier is identified as XYZ and the country is identified as the United States of America.

At 613, a masking code (e.g., *67) honored by the mobile carrier XYZ in the U.S.A. may be appended to the private contact before placing the call. Then, at 615, the private call may be placed. In an embodiment, the masking code may be used to alert one or more service providers that the private contact is to be hidden from the calling user's account, billing records, etc. The mobile carrier XYZ may accept the masking code (control code), and suppress or conceal the private contact in reports, billing, call logs, etc. The mobile carrier XYZ may provide a notification to the user device that the masking code has been accepted.

In response to receiving the incoming call, the user device 60 may provide an alert that an incoming call is from contact name, with the phone number of the calling device being masked. In this example, it is assumed that the user of the calling device has an obscured contact shared with the user device 60, and based on the obscured contact of the calling device, the phone number of the calling device is to be obscured on the user device 60. As a result, the phone number of the user device 60 was obscured from view by the user of the calling device, and the phone number of the calling device was obscured from view by the user of the user device 60.

Figure 7:
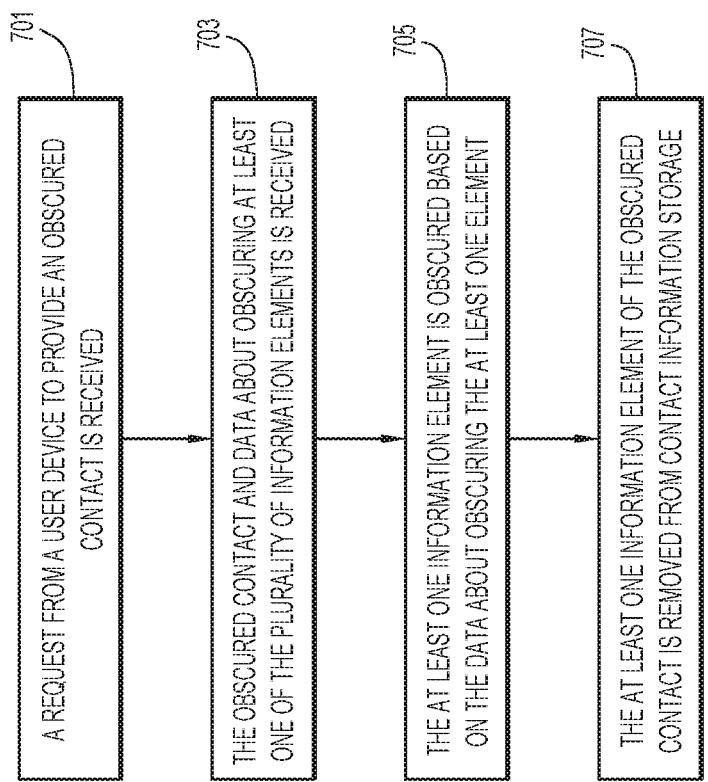
FIG. 7 is a flowchart of a method for obscured contact information sharing according to an embodiment of the present invention.

FIG. 7 is a flowchart of a method for obscured contact information sharing, according to an example embodiment. In step 701, a request from a user device to provide an obscured contact is received. The obscured contact may include a plurality of information elements. For example, a first user device (e.g., user device 10 of FIG. 1) may receive a request from a second user device (e.g., user device 12 of FIG. 1) to provide an obscured contact that includes a plurality of information elements. The first user device may receive the request from the second user device via a short-range wireless communication technology, such as, for example, NFC. The request for the user device to provide an obscured contact, for example, may be part of a obscured contact sharing handshake.

In step 703, the obscured contact and data about obscuring at least one of the plurality of information elements of the obscured contact is received.

In step 705, the at least one information element of the obscured contact is obscured from presentation based on the data about obscuring at least one of the plurality of information elements of the obscured contact. For example, the at least one information element of the obscured contact may be obscured by an operating system of the first user device from presentation by the first user device to a user.

In step 707, the at least one information element of the obscured contact is removed from contact information storage. For example, the at least one information element may be removed from contact storage of the first user device in response to detection of a predetermined time indicated by the second user device or a delete command from the second user device.

In an embodiment, the method may further include receiving a command to unobscure one or more information elements of the plurality of information elements, and in response to the command, unobscuring the one or more information elements. For example, the first user device may receive the command from the second user device, and in response to receiving the command, the first user device may unobscure the one or more information elements. For example, the command may include the one or more information elements of the obscured contact that are to be unobscured or other information that allows the first user device to identify which information elements of the obscured contact are to be unobscured, and in response to receiving the command, those one or more information elements may be unobscured. As another example, the command may not indicate any particular information elements to unobscure, and by default, all information elements of the obscured contact that are obscured may be unobscured in response to receiving the command. When an information element is unobscured, for example, the information element may no longer be hidden from presentation to the user of the user device. Unobscuring an information element that is obscured may involve, e.g., changing or removing a private flag that is set to indicate that the information element is obscured to indicate that the information element is not obscured. Unobscuring an information element that is obscured may involve, e.g., sending a command to a telecommunication service provider of the user device for the service provider to not obscure the information element from call records of the user device. Some information elements may be unobscured while other information elements may remain obscured, become obscured, or be deleted.

For example, a user of the second user device may desire to unobscure a phone number that has been obscured and may desire an email address that has been obscured to be preemptively deleted. In such an example, the user of the second user device may provide respective input to the second user device that causes the second user device to send a command to the first user device for the phone number to be unobscured and to send a delete command to first user device for the email address to be deleted prior to a previously set expiration time for the email address. In response to receiving the command and the delete command, the first user device may unobscure the phone number and may delete the email address.

Figure 8:
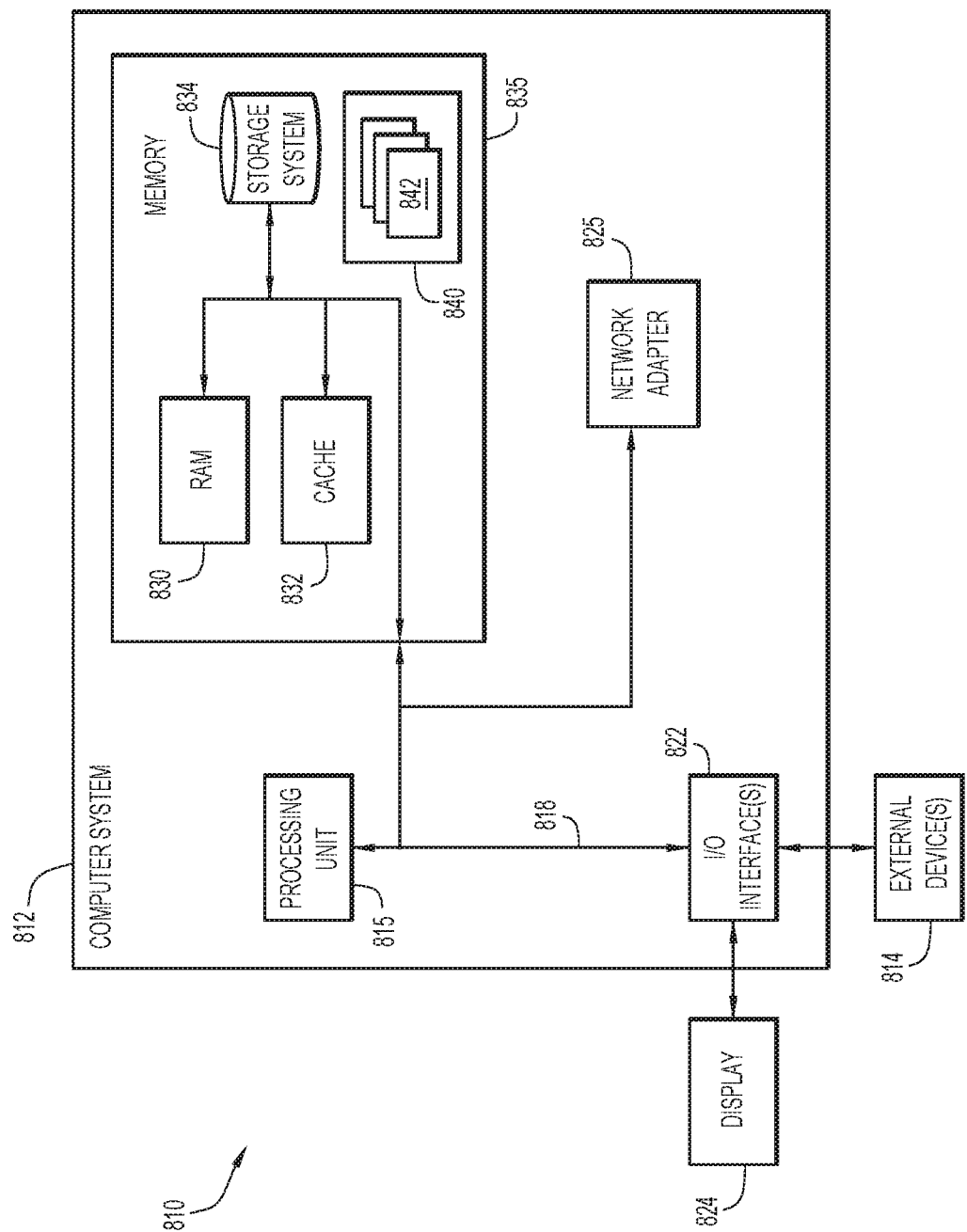
FIG. 8 is a block diagram of an example computing device according to an embodiment of the present invention.

Referring now to FIG. 8, a schematic of an example of a computing device 810 of computing environment (e.g., implementing user devices 10, 12, 20, 22, 30, 32, 40, 42, 50, 52, and/or 60) is shown. The computing device is only one example of a suitable computing device for computing environment and is not intended to suggest any limitation as to the scope of use or functionality of embodiments of the invention described herein. Regardless, computing device 810 is capable of being implemented and/or performing any of the functionality set forth herein.

In computing device 810, there is a computer system 812 which is operational with numerous other general purpose or special purpose computing system environments or configurations. Examples of well-known computing systems, environments, and/or configurations that may be suitable for use with computer system 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 812 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 8, computer system 812 is shown in the form of a general-purpose computing device. The components of computer system 812 may include, but are not limited to, one or more processors or processing units 815, a system memory 835, and a bus 818 that couples various system components including system memory 835 to processor 815.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 812 typically includes a variety of computer system readable media. Such media may be any available media that is accessible by computer system 812, and it includes both volatile and non-volatile media, removable and non-removable media.

System memory 835 can include computer system readable media in the form of volatile memory, such as random access memory (RAM) 830 and/or cache memory 832. Computer system 812 may further include other removable/non-removable, volatile/non-volatile computer system storage media. By way of example only, storage system 834 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 835 may include at least one program product having a set (e.g., at least one) of program modules that are configured to carry out the functions of embodiments of the invention.

Program/utility 840, having a set (at least one) of program modules 842 (e.g., site module 816, evaluation module 820, communications module 822, evaluation agent 824, etc.) may be stored in memory 835 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system 812 may also communicate with one or more external devices 814 such as a keyboard, a pointing device, a display 824, etc.; one or more devices that enable a user to interact with computer system 812; and/or any devices (e.g., network card, modem, etc.) that enable computer system 812 to communicate with one or more other computing devices. Such communication can occur via Input/Output (I/O) interfaces 822. Still yet, computer system 812 can communicate with one or more networks such as a local area network (LAN), a general wide area network (WAN), and/or a public network (e.g., the Internet) via network adapter 825. As depicted, network adapter 825 communicates with the other components of computer system 812 via bus 818. It should be understood that although not shown, other hardware and/or software components could be used in conjunction with computer system 812. Examples, include, but are not limited to: microcode, device drivers, redundant processing units, external disk drive arrays, RAID systems, tape drives, and data archival storage systems, etc.

It will be appreciated that the embodiments described above and illustrated in the drawings represent only a few of the many ways of implementing embodiments for obscured contact sharing.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g.,) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., private contact sharing components) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., contacts, contact lists, obfuscation data, information elements, cryptographic keys, cryptographic key exchange protocols, and/or other information used in or associated with obscured contact sharing or using obscured contacts). The database system may be implemented by any number of any conventional or other databases, data stores or storage structures (e.g., files, databases, data structures, data or other repositories, etc.) to store information (e.g., contacts, contact lists, obfuscation data, information elements, cryptographic keys, cryptographic key exchange protocols, and/or other information used in or associated with obscured contact sharing or using obscured contacts). The database system may be included within or coupled to the server and/or client systems. The database systems and/or storage structures may be remote from or local to the computer or other processing systems, and may store any desired data (e.g., contacts, contact lists, obfuscation data, information elements, cryptographic keys, cryptographic key exchange protocols, and/or other information used in or associated with obscured contact sharing or using obscured contacts).

The present invention embodiments may employ any number of any type of user interface (e.g., Graphical User Interface (GUI), command-line, prompt, etc.) for obtaining or providing information (e.g., contacts, contact lists, obfuscation data, information elements, cryptographic keys, cryptographic key exchange protocols, and/or other information used in or associated with obscured contact sharing or using obscured contacts), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., text analytics, profile scores, demographic information pertaining to the document author, etc.).

The present invention embodiments are not limited to the specific tasks or algorithms described above, but may be utilized for obscured contact sharing and using obscured contacts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for obscured contact information sharing, the method comprising:
   receiving, via an electronic communications interface of a first user device, a request from a second user device to provide an obscured contact, wherein the obscured contact includes a plurality of information elements;
   receiving, via an electronic communications interface of the first user device from the second user device, the obscured contact and data about obscuring at least one of the plurality of information elements of the obscured contact, wherein the at least one information element includes contact information for sending communications and the data about obscuring includes a predetermined time for deletion of the obscured contact from the first user device;
   based on the data about obscuring the at least one information element, obscuring, by an operating system of the first user device, the at least one information element of the obscured contact from presentation by the first user device to a user during the predetermined time;
   presenting to the user, by the first user device, a contact list of one or more contacts including the obscured contact and selecting the obscured contact from the contact list, wherein the contact list presents an identifier for the obscured contact and the contact information for the obscured contact is obscured from presentation by the first user device to the user;
   sending, via the first user device, a communication using the contact information of the obscured contact during the predetermined time, wherein the communication includes one of a call, text message, and email message;
   receiving, via an electronic communications interface of the first user device from the second user device during the predetermined time, a command including a new time and modifying the predetermined time to the new time for deletion of the obscured contact from the first user device; and
   removing, by the operating system of the first user device, the obscured contact from contact information storage of the first user device in response to expiration of the modified predetermined time.

2. The method of claim 1, wherein the plurality of information elements of the obscured contact includes a phone number of the second user device.

3. The method of claim 1, wherein obscuring, by an operating system of the first user device, the at least one information element of the obscured contact from presentation by the first user device to a user includes setting a flag for the at least one information element indicating that the at least one information element is obscured from presentation.

4. The method of claim 3, further comprising:
   receiving, via a user interface of the first user device, an input associated with presenting the at least one information element of the obscured contact;
   in response to receiving the input, checking if the flag is set for the at least one information element; and
   in response to determining that the flag is set, obscuring the at least one information element.

5. The method of claim 1, further comprising:
   receiving, at the first user device, a command to unobscure an information element of the plurality of information elements, the information element having been obscured; and
   in response to the command to unobscure an information element, unobscuring the information element.

6. The method of claim 1, further comprising:
   performing a cryptographic key exchange by the first user device with the second user device; and
   mapping, by the operating system of the first user device, the at least one information element in an encrypted form to a corresponding cryptographic key for decrypting the at least one information element from the encrypted form.

7. The method of claim 1, further comprising providing by the first user device to the second user device, a verification that a telecommunication provider associated with the first user device supports concealing the at least one information element of the second user device from one or more call records associated with the first user device.

8. A system for obscured contact information sharing, the system comprising:
   a first user device comprising a processor configured to:
     receive, via an electronic communications interface of the first user device, a request from a second user device to provide an obscured contact, wherein the obscured contact includes a plurality of information elements;
     receive, via an electronic communications interface of the first user device from the second user device, the obscured contact and data about obscuring at least one of the plurality of information elements of the obscured contact, wherein the at least one information element includes contact information for sending communications and the data about obscuring includes a predetermined time for deletion of the obscured contact from the first user device;
     based on the data about obscuring the at least one information element, obscure, by an operating system of the first user device, the at least one information element of the obscured contact from presentation by the first user device to a user during the predetermined time;
     present to the user a contact list of one or more contacts including the obscured contact and select the obscured contact from the contact list, wherein the contact list presents an identifier for the obscured contact and the contact information for the obscured contact is obscured from presentation by the first user device to the user;

send a communication using the contact information of the obscured contact during the predetermined time, wherein the communication includes one of a call, text message, and email message;

receive, via an electronic communications interface of the first user device from the second user device during the predetermined time, a command including a new time and modify the predetermined time to the new time for deletion of the obscured contact from the first user device; and remove, by the operating system of the first user device, the obscured contact from contact information storage of the first user device in response to expiration of the modified predetermined time.

9. The system of claim 8, wherein the plurality of information elements includes a phone number of the second user device.

10. The system of claim 8, wherein the at least one information element of the obscured contact is obscured from presentation by the first user device to a user at least in part by setting a flag for the at least one information element indicating that the at least one information element is obscured from presentation.

11. The system of claim 10, wherein the first user device is configured to:

receive, via a user interface of the first user device, an input associated with presenting the at least one information element of the obscured contact;

in response to receiving the input, check if the flag is set for the at least one information element; and in response to a determination that the flag is set, obscure the at least one information element.

12. The system of claim 8, wherein the first user device is configured to provide to the second user device, a verification that a telecommunication provider associated with the first user device supports concealing the at least one information element of the second user device from one or more call records associated with the first user device.

13. A computer program product for obscured contact information sharing, the computer program product comprising one or more computer readable storage media having program instructions collectively stored on the one or more computer readable storage media, the program instructions executable by a processor to cause the processor to:

receive, via an electronic communications interface of a first user device, a request from a second user device to provide an obscured contact, wherein the obscured contact includes a plurality of information elements;

receive, via an electronic communications interface of the first user device from the second user device, the obscured contact and data about obscuring at least one of the plurality of information elements of the obscured contact, wherein the at least one information element includes contact information for sending communications and the data about obscuring includes a predetermined time for deletion of the obscured contact from the first user device;

based on the data about obscuring the at least one information element, obscure, by an operating system of the first user device, the at least one information element of the obscured contact from presentation by the first user device to a user during the predetermined time;

present to the user, by the first user device, a contact list of one or more contacts including the obscured contact and select the obscured contact from the contact list, wherein the contact list presents an identifier for the obscured contact and the contact information for the obscured contact is obscured from presentation by the first user device to the user;

send, via the first user device, a communication using the contact information of the obscured contact during the predetermined time, wherein the communication includes one of a call, text message, and email message;

receive, via an electronic communications interface of the first user device from the second user device during the predetermined time, a command including a new time and modify the predetermined time to the new time for deletion of the obscured contact from the first user device; and remove, by the operating system of the first user device, the obscured contact from contact information storage of the first user device in response to expiration of the modified predetermined time.

14. The computer program product of claim 13, wherein the plurality of information elements includes a phone number of the second user device.

15. The computer program product of claim 13, wherein the at least one information element of the obscured contact is obscured from presentation by the first user device to a user at least in part by the processor being caused to set a flag for the at least one information element indicating that the at least one information element is obscured from presentation.

16. The computer program product of claim 13, wherein the first user device is configured to provide to the second user device, a verification that a telecommunication provider associated with the first user device supports concealing the at least one information element of the second user device from one or more call records associated with the first user device.

* * * * *